United States Patent
Zhang et al.

(10) Patent No.: US 9,464,950 B2
(45) Date of Patent: Oct. 11, 2016

(54) CAPACITIVE PRESSURE SENSORS FOR HIGH TEMPERATURE APPLICATIONS

(71) Applicant: Rosemount Aerospace Inc., Burnsville, MN (US)

(72) Inventors: Weibin Zhang, Burnsville, MN (US); Anita Fink, Burnsville, MN (US); Saeed Fahimi, Bloomington, MN (US); Kimiko J. Childress, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 231 days.

(21) Appl. No.: 14/185,156

(22) Filed: Feb. 20, 2014

(65) Prior Publication Data

US 2015/0276512 A1 Oct. 1, 2015

Related U.S. Application Data

(60) Provisional application No. 61/912,861, filed on Dec. 6, 2013, provisional application No. 61/904,946, filed on Nov. 15, 2013.

(51) Int. Cl.
*G01L 1/14* (2006.01)
*G01L 9/00* (2006.01)
*G01L 19/00* (2006.01)
*G01L 19/06* (2006.01)

(52) U.S. Cl.
CPC ............. *G01L 1/14* (2013.01); *G01L 9/0047* (2013.01); *G01L 9/0075* (2013.01); *G01L 19/0076* (2013.01); *G01L 19/0618* (2013.01)

(58) Field of Classification Search
CPC ............. G01L 9/0075; G01L 9/0047; G01L 19/0076; G01L 1/14; G01L 9/0048
USPC ........................................... 73/862.626
See application file for complete search history.

(56) References Cited

U.S. PATENT DOCUMENTS

| | | | |
|---|---|---|---|
| 5,349,492 A | 9/1994 | Kimura et al. | |
| 6,311,563 B1 | 11/2001 | Ishikura | |
| 6,341,527 B1 | 1/2002 | Ishikura et al. | |
| 7,191,661 B2 * | 3/2007 | Ohms | G01L 9/0073 73/718 |
| 7,539,003 B2 * | 5/2009 | Ray | B81B 3/0021 361/272 |
| 8,141,429 B2 | 3/2012 | Guo | |
| 8,973,438 B2 * | 3/2015 | Kim | G01C 19/5755 73/493 |
| 2013/0068022 A1 | 3/2013 | Jeung et al. | |

FOREIGN PATENT DOCUMENTS

| | | |
|---|---|---|
| EP | 0982576 A1 | 3/2000 |
| EP | 1091202 A2 | 4/2001 |
| WO | WO-2008066569 A2 | 6/2008 |

OTHER PUBLICATIONS

Search Report and Opinion issued by the European Patent Office on Apr. 2, 2015 for European Patent Application No. 14193262.

* cited by examiner

*Primary Examiner* — Freddie Kirkland, III
(74) *Attorney, Agent, or Firm* — Locke Lord LLP; Scott D. Wofsy; Christopher J. Cillié

(57) ABSTRACT

A capacitive pressure sensor includes a substrate wafer and a diaphragm wafer. The substrate wafer defines a substrate recess with a first recess. The diaphragm wafer defines a diaphragm recess with a second recess. The diaphragm wafer is bonded to the substrate wafer such that the substrate and diaphragm recesses form a height differentiated pressure chamber.

14 Claims, 4 Drawing Sheets

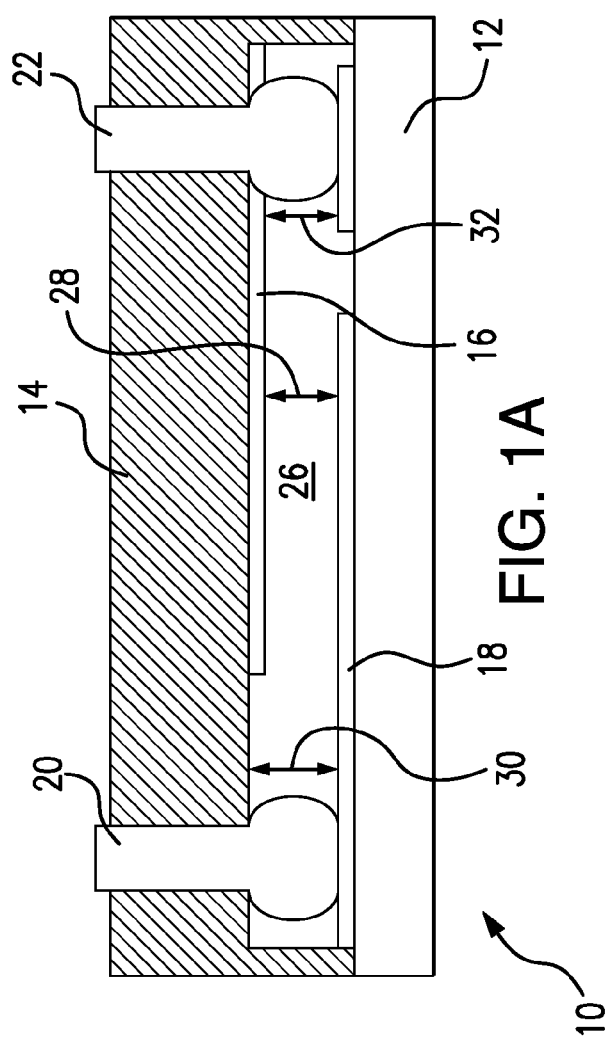
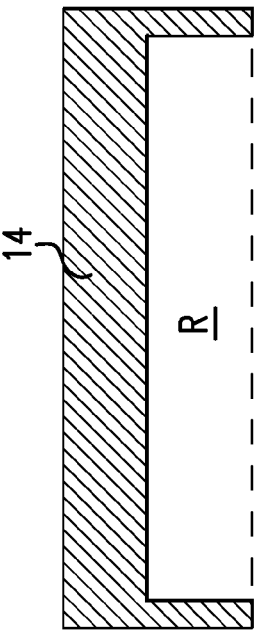

CAPACITIVE PRESSURE SENSORS FOR HIGH TEMPERATURE APPLICATIONS

CROSS-REFERENCE TO RELATED APPLICATIONS

This application claims priority to and the benefits of U.S. Provisional Patent Application No. 61/912,861, filed on Dec. 6, 2013, and U.S. Provisional Patent Application No. 61/904,946, filed on Nov. 15, 2013, each of which are incorporated by reference herein in their entireties.

BACKGROUND OF THE INVENTION

1. Field of the Invention

The present disclosure relates to pressure measurement devices, and more particularly to capacitive pressure sensors for high temperature environments.

2. Description of Related Art

Conventional sapphire-based high temperature capacitive pressure sensors generally include a thin diaphragm wafer coupled to a thick substrate wafer with a uniform depth recess. The wafers typically include separate electrodes, one electrode being formed on the diaphragm wafer surface and the other being formed in the substrate recess. The wafers are bonded together such that the substrate recess forms a main recess gap separating the electrodes. Through vias typically extend through the substrate wafer and the substrate wafer recess, physically and electrically connecting with the electrodes. This allows for measuring the capacitance between the electrodes. Capacitance is a function of the main recess gap height. The main recess gap height changes in response to external pressure, changing capacitance as a function of external pressure and allowing for measurement of external pressure. The main recess gap depth is generally determined by pressure sensor's mechanical and electrical designing characteristics such as external pressure range, read-out capacitance, sensitivity and reliability.

A via recess provides housing for all electrical connection between the through vias and the electrodes. In applications when a hermetic pressure chamber is required, via sealing, such as with a conductive paste or with conductive thin films, is typically applied to seal the through wafer vias such that the internal pressure chamber formed by the substrate recess is separated from the environment external to the sensor. For both conductive paste via sealing and conductive thin film via sealing, a small via recess gap is desired to minimize the conductive paste flowing into the pressure chamber and to minimize the total amount of the conductive thin film deposition.

In most of the conventional capacitive sensors, the via recess is defined at the same time when defining a substrate recess or a diaphragm recess. Also, in some of the conventional capacitive sensors, via recesses are defined in both the substrate and the diaphragm wafers. In both cases, the total via recess depth is dependent on the pressure chamber depth design, in which case, the via recess depth may not be optimized for the via sealing when a hermetic pressure chamber is required. This present disclosure provides one solution to address these issues.

SUMMARY OF THE INVENTION

A capacitive pressure sensor for high temperature applications (>700 C) and other harsh environments is constructed from a material selected from a group consisting of sapphire, quartz, and silicon carbide. The pressure sensor includes a substrate wafer and a diaphragm wafer. The substrate wafer defines a main substrate recess with a first recess. The diaphragm wafer defines a main diaphragm recess with a second recess. One of the substrate and diaphragm wafers defines an independent via recess with a third recess. The diaphragm wafer is bonded to the substrate wafer such that the substrate and diaphragm recesses form a capacitive pressure chamber, the independent via recess forms a via chamber.

In certain embodiments, a via recess defined in one of the substrate and diaphragm wafers has a depth less than the corresponding main recess depth in the same wafer. The via recess and the main chamber recesses are defined independently by proper recess forming process, such as chemical wet etch, plasma enhanced dry etch, or other mechanical etch.

Two electrodes are disposed inside the pressure chamber on surfaces of both the diaphragm and the substrate wafers to form a capacitor. The capacitance of the capacitor is a function of the deflection of the diaphragm. Deflection of the diaphragm varies based on pressure difference between the external environment and the sensor internal chamber. Electrical leads extend the electrical continuity from the electrodes to the via chamber.

In certain embodiments, a first via extends through the substrate wafer and into the via chamber, connecting to one of the electrodes. At least one second via extends through the substrate wafer and into the via chamber, connecting to the other electrode. Both vias also provide the physical paths to connect the external environment pressure and the internal chamber pressure.

In accordance with certain embodiments, a via can be formed within a tapered aperture defined by the substrate wafer. A tapered aperture with larger entrance dimension and smaller exit dimension extends through the substrate wafer and connects to the via chamber. The tapered shape of the via aperture can be achieved by proper chemical etch or physical etch. In certain embodiments, the via is formed by metallic film deposition either by sputtering or evaporation. Also in certain embodiment, the via recess is sealed by the via metallic film deposition to form a hermetic internal pressure chamber.

For high temperature application (>700 C), it is contemplated the metallic materials used for either the electrode or the via can be selected from a group consisting of gold, tantalum, platinum, palladium, iridium and corresponding doped alloys thereof.

A limit body defined by one of the diaphragm and substrate wafers can be disposed within the pressure chamber to protect the sensor from the pressure overloading due to unexpected pressure shock by limiting the maximum diaphragm deflection and to protect the pressure sensor from electrode directly contacting.

The substrate wafer can be bonded to the diaphragm wafer by direct wafer bonding. An intermediate layer disposed between the substrate and diaphragm wafers can also be used to bond the substrate wafer to the diaphragm wafer.

A method of making a capacitive pressure sensor includes defining a substrate recess in a substrate wafer, defining a diaphragm recess in a diaphragm wafer, defining a via recess in one of the substrate and diaphragm wafers, bonding the substrate wafer to the diaphragm wafer such that the substrate recess and diaphragm recess form a capacitive pressure chamber, the via recess forms a via chamber, and forming a via extending through the substrate wafer and into the via chamber.

It is contemplated that forming a via can include defining a tapered aperture extending through the substrate wafer. Forming a via can further include depositing a metallic conducive layer on inner surfaces of a tapered aperture and into the via chamber bounding the aperture.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1A is a schematic cross-sectional side elevation view of a conventional capacitive pressure sensor;

FIG. 1B is a schematic cross-sectional side elevation view of a substrate wafer of the sensor of FIG. 1A, showing a recess of the wafer;

DETAILED DESCRIPTION OF THE PREFERRED EMBODIMENTS

Figure 2A:
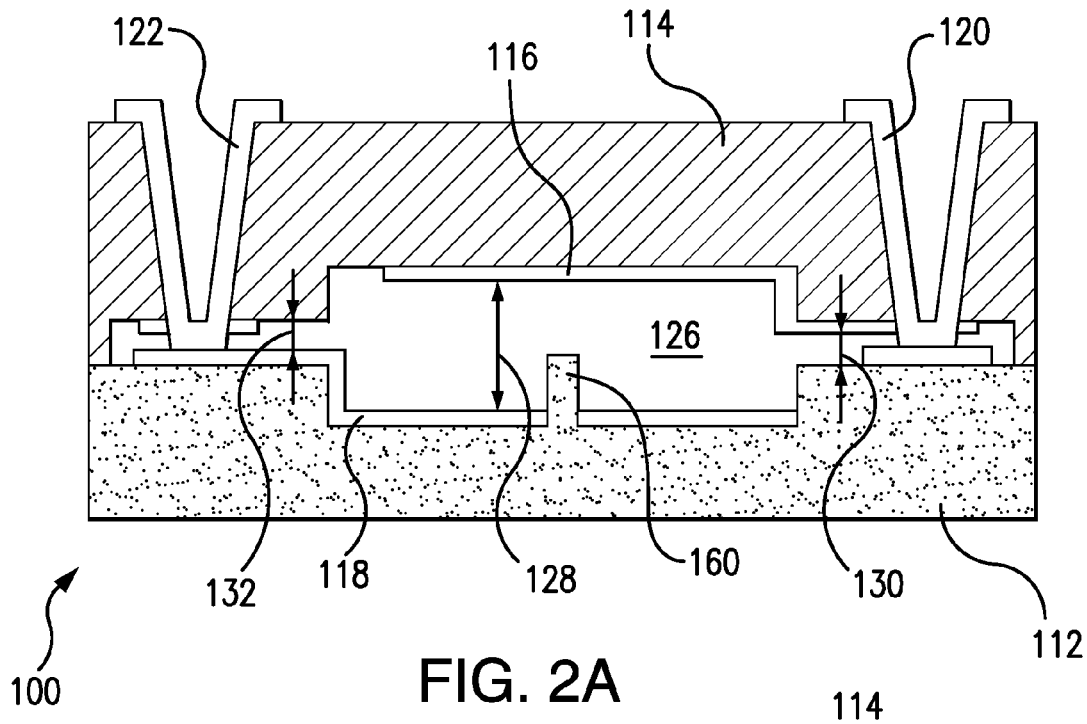
FIG. 2A is a side elevation view of a capacitive pressure transducer constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of a capacitive pressure sensor in accordance with the disclosure is shown in FIG. 2 and is designated generally by reference character 100. Other embodiments of pressure sensors in accordance with the disclosure, or aspects thereof, are provided in FIG. 3 and FIG. 4, as will be described. The systems and methods described herein can be used for pressure measurement, such as in gas turbine engines for example.

Referring first to FIG. 1A, a conventional capacitive pressure sensor 10 is shown. Capacitive pressure sensor 10 includes a diaphragm wafer 12, a substrate wafer 14, first and second electrodes 16 and 18, and first and second vias 20 and 22. Substrate wafer 14 defines a recess R with a substantially uniform depth extending laterally across substrate wafer 14. Substrate wafer 14 is attached to diaphragm wafer 12 such that recess R (shown in FIG. 1B) forms a pressure chamber 26 between diaphragm wafer 12 and substrate wafer 14.

First electrode 16 is disposed over a surface portion of substrate wafer 14. Second electrode 18 is disposed over a surface portion of diaphragm wafer 12 within pressure chamber 26. Diaphragm wafer 12 attaches to substrate wafer 14 such that first electrode 16 and second electrode 18 are respectively disposed on opposite sides of pressure chamber 26. First and second vias 20 and 22 extend through substrate wafer 14 and into pressure chamber 26, physically connecting with electrode 16 and electrode 18.

Substrate recess R (shown in FIG. 1B) defines both the main pressure chamber 26 with gap 28 and the via chambers with gap 30 and 32. For a uniform recess R, gap 28, 30 and 32 have the same height. In conventional capacitive pressure sensors, first and second vias 20 and 22 are typically formed from a conductive paste, such as glass frit for example. These materials can impose certain restrictions on the arrangement of conventional capacitive pressure sensors. For example, respective height (i.e. gap size) of the via recesses with gap 30 and 32 influences conductive paste reflow during via sealing. Excessive reflow into pressure chamber can potentially cause electrode shortage and sensor failure.

Figure 2B:
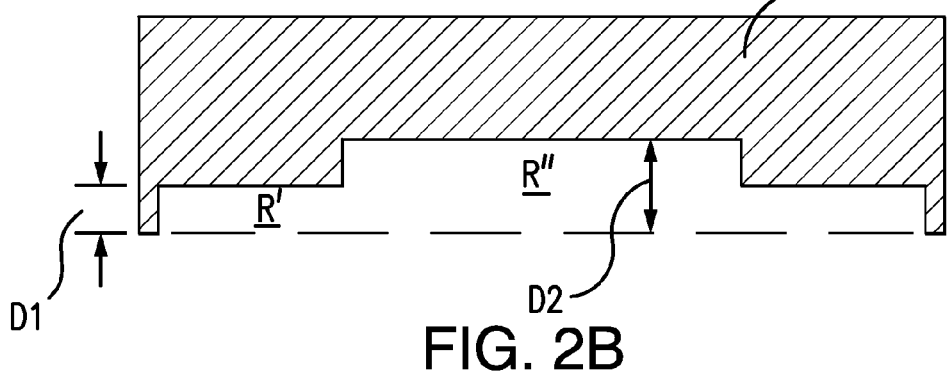
FIG. 2B is side elevation view of a substrate wafer of the sensor of FIG. 2A, showing a substrate wafer with a deeper main recess and a shallower via recess.
Figure 2C:
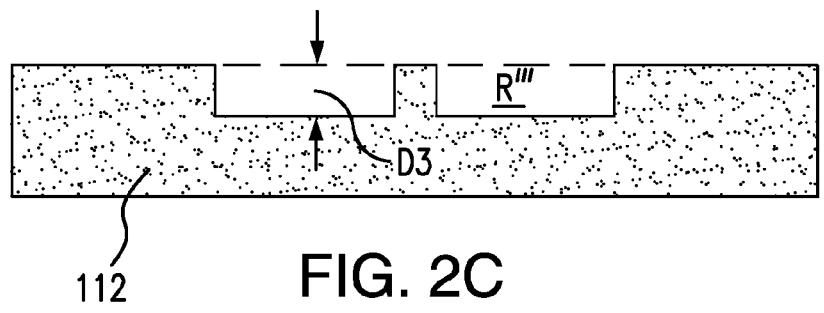
FIG. 2C is side elevation view of a diaphragm wafer of the sensor of FIG. 2A, showing a diaphragm wafer with a recess.

Referring now to FIG. 2A, a capacitive pressure sensor 100 is shown. Capacitive pressure sensor 100 includes a diaphragm wafer 112, a substrate wafer 114, first and second electrodes 116 and 118, first and second vias 120 and 122, and a limit body 160. As illustrated in FIG. 2B, substrate wafer 114 defines a shallower via recess R' with depth D1 and a deeper main substrate recess R" with depth D2. D1 is less than D2. As illustrated in FIG. 2C, diaphragm wafer 112 defines a main diaphragm recess R'" depth D3.

With continuing reference to FIG. 2A, electrode 116 is disposed over a surface portion of substrate wafer 114 within substrate recess R". Electrode 118 is disposed over a surface portion of diaphragm wafer 112 within diaphragm recess R'". Substrate wafer 114 is bonded to diaphragm wafer 112 such that substrate wafer recess R" and diaphragm wafer recess R'" collectively form a capacitive pressure chamber 126. Via recess R' in substrate wafer 114 forms a via chamber housing all the electrical leads connecting with electrode 116 and 118. Independent recess design of R', R" and R'" can allow for added sensor design flexibility such that R" and R'" can be chosen for design optimization and R' can be chosen to improve the fabrication robustness. A shallow R' with small depth D1 can allow for forming vias, as discussed below, using a metallization process rather than a conductive paste process. Vias formed using metallization process in turn can provide a more effective seal considering there is no conductive paste reflow concern. Also metallization process can allow much higher sensor operating temperature than a conductive paste process.

Diaphragm wafer 112 is configured and adapted to deform in response to external pressure change. As will be appreciated by those skilled in the art, this alters the height of electrode gap 128, changing the capacitance associated therewith between first and second electrodes 116 and 118. Other aspects of operation of capacitive pressure sensors is generally described in U.S. Pat. No. 5,349,492, U.S. Pat. No. 6,311,563, U.S. Pat. No. 6,341,527 and U.S. Pat. No. 8,141,429, each of which incorporated herein by reference in its entirety.

First and second via 120 and 122 extend through substrate wafer 114 and into via chamber formed by via recess R', connecting with electrode 116 and 118 through the electrode leads housed within via recess R'. First and second vias 120 and 122 are formed from using a metallization process, such as a sputtering process, within (and below) first and second apertures 146 and 148 (shown in FIG. 3) defined by substrate wafer 114. The apertures which form a base for the metallization layer are tapered, e.g. having a greater width at substrate wafer external surface than at pressure chamber 126. This can allow for control of the aperture sidewall slope to meet the via forming requirements. A proper slope can allow uniform via formation. It can also allow for improved via sealing if a hermetic internal chamber is required.

With reference to FIG. 2A and FIG. 2C, a limit body 160 is defined by diaphragm wafer 112 within recess R'''. Limit body 160 extends through second electrode 118 and into pressure chamber 126. Diaphragm wafer 112 and substrate wafer 114 are aligned with one another such that limit body 160 is opposite first electrode 116. This can prevent electrode shorting as limit body 160 restrict the deformations of diaphragm wafer 112 that otherwise would allow second electrode 118 to physically contact (and electrically connect with) first electrode 116. It can also potentially protect sensors from shorting, thereby providing improved reliability and/or suitability for harsh environments subject to pressure shock waves, such as gas turbine engines for example.

At least one of diaphragm wafer 112 and substrate wafer 114 are formed from sapphire, quartz, and silicon carbide. At least one of first and second electrodes is formed from a material including gold, tantalum, palladium, platinum, iridium, and their corresponding doped alloy thereof. At least one of first and second vias is formed from a material including gold, tantalum, palladium, platinum, iridium, and their corresponding doped alloy thereof. Bonding can be through direct wafer bonding or through an intermediate layer bonding using a material suitable for extremely high temperatures. This construction can provide capacitive pressure sensors suitable for use in harsh environments. Examples of harsh environments include gas turbine engines where extremely high temperatures can be experienced.

Figure 3:
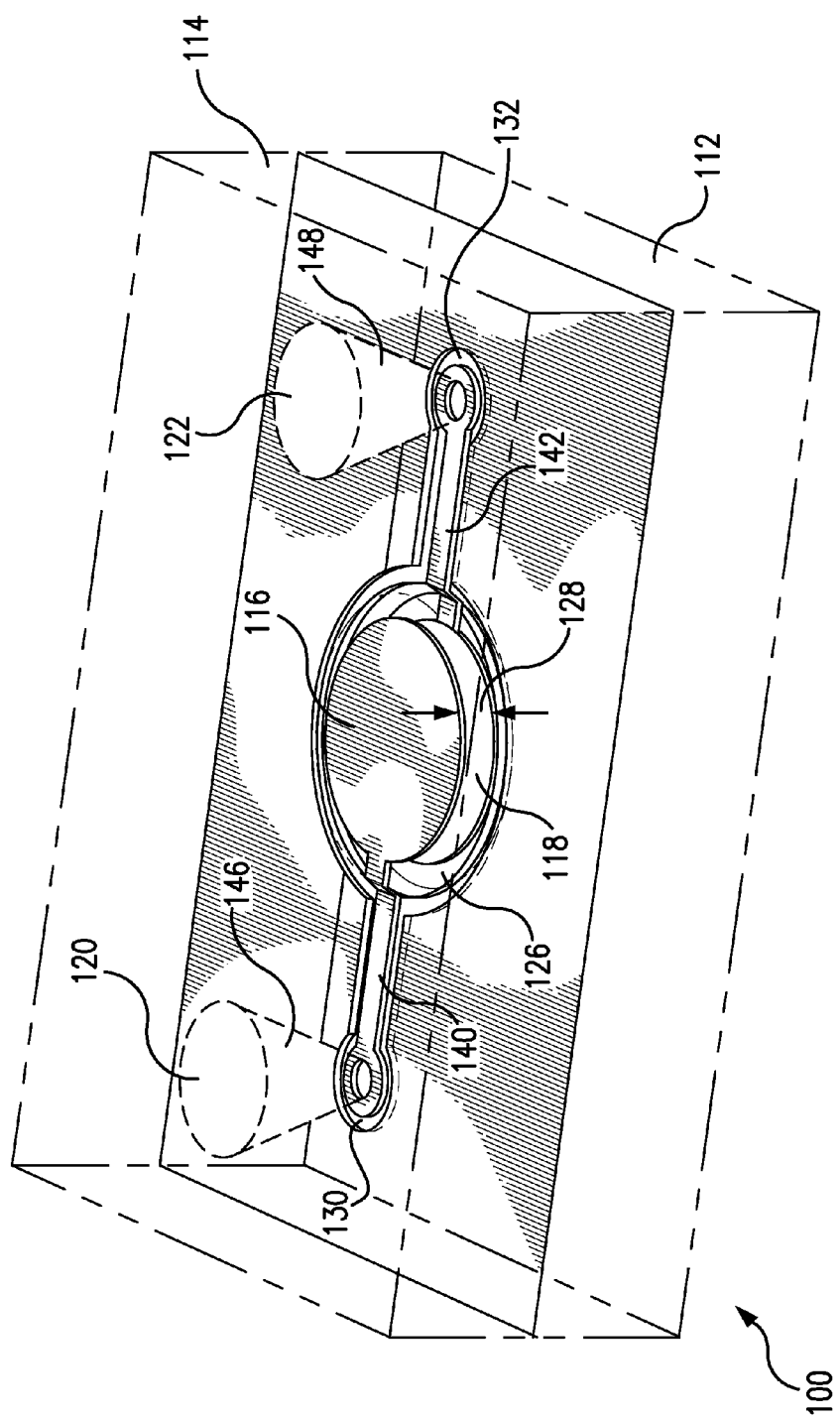
FIG. 3 is a perspective view of the sensor of FIG. 2A, showing internal structures of the sensor.

With reference to FIG. 3, capacitive pressure sensor 100 in perspective view with substrate wafer 114 illustrated transparently. Capacitive pressure sensor 100 includes a first lead 140 and a second lead 142. First lead 140 extends between first electrode 116 and first via 120, electrically connecting the structures to one another. First lead 140 can be integral with first electrode 116 and formed over a surface of substrate wafer 114. Second lead 142 is similar to first lead 140 with the differences that second lead 142 extends between second electrode 118 and second via 122. First and second leads 140 and 142 are housed in via recess R' without affecting the wafer bonding process.

Figure 4:
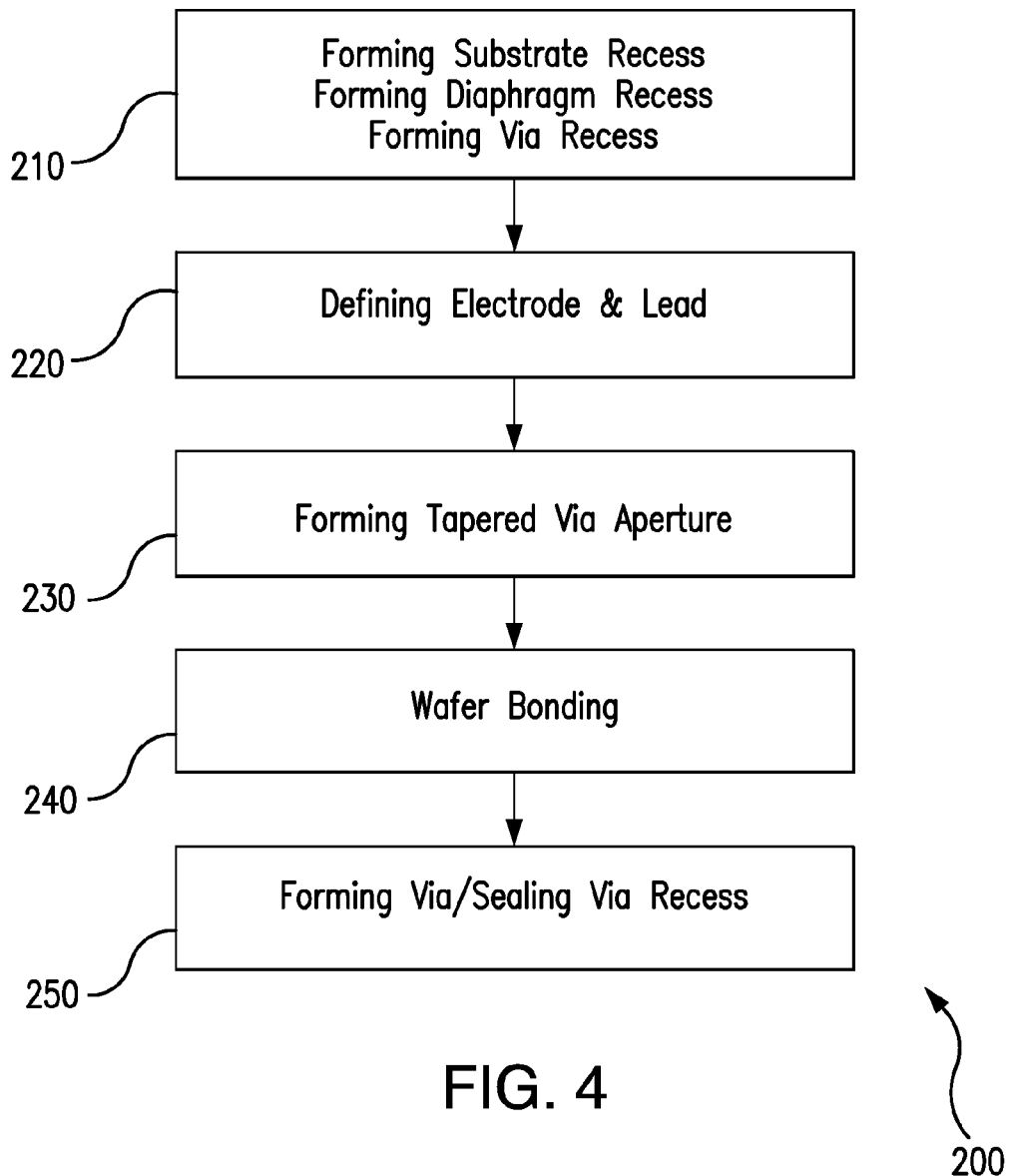
FIG. 4 is a flow chart showing processes for fabricating the sensor of FIG. 2A, according to an embodiment.

With reference to FIG. 4, a method 200 making a capacitive pressure sensor is shown. Method 200 includes (a) defining 210 a substrate recess in a substrate wafer, a via recess in a substrate wafer, a diaphragm recess in a diaphragm wafer; (b) defining 220 electrodes and corresponding leads in both diaphragm and substrate wafers; (c) forming 230 tapered via aperture; and (d) wafer bonding 240 of substrate wafer and diaphragm wafer; and (e) forming 250 via and sealing via recess if a hermetic internal chamber is a need.

The forming of substrate recess, diaphragm recess, via recess and the via tapered aperture can be achieved by different physical etching processes, chemical etching processes, or a combination of physical and chemical etching processes. Metallic film deposition for the electrodes, leads, and vias can be achieved by different deposition processes, such as sputtering or evaporation for example.

The methods and systems of the present disclosure, as described above and shown in the drawings, provide for capacitive pressure sensors and method of producing such pressure sensors with superior properties including tolerance of extremely high temperature environments. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A capacitive pressure sensor, comprising:
   a substrate wafer defining a main substrate recess and having a first electrode;
   a diaphragm wafer defining a main diaphragm recess and having a second electrode;
   one of the substrate and diaphragm wafers defining an independent via recess, wherein the diaphragm wafer is bonded to the substrate wafer such that the substrate and diaphragm recesses form a height differentiated pressure chamber, and the via recess forms a via chamber,
   wherein a depth of the via recess is less than a depth of the corresponding main recess in the same wafer.

2. A sensor as recited in claim 1, further including at least two vias and at least two leads, wherein the vias extend through the substrate wafer and into the via chamber, wherein the leads extend between the electrodes and the via chamber.

3. A sensor as recited in claim 2, wherein a via is formed within a tapered aperture defined by the substrate wafer.

4. A sensor as recited in claim 3, wherein the via recess is physically sealed to form a hermetic pressure chamber during via formation.

5. A sensor as recited in claim 4, wherein the via is formed by metallic film deposition formation.

6. A sensor as recited in claim 1, wherein the substrate wafer is bonded to the diaphragm wafer by direct wafer bonding.

7. A sensor as recited in claim 1, further including an intermediate layer disposed between the substrate and diaphragm wafers and bonding the substrate wafer to the diaphragm wafer.

8. A sensor as recited in claim 1, further including a limit body defined by one of diaphragm and substrate wafers, wherein the limit body is disposed inside the pressure chamber.

9. A sensor as recited in claim 1, wherein at least one of the wafers is constructed from a material selected from the group consisting of sapphire, quartz, and silicon carbide.

10. A sensor as recited in claim 1, wherein at least one of the first and second electrodes is constructed from a material selected from the group consisting of gold, tantalum, platinum, palladium, iridium and corresponding doped alloys thereof.

11. A sensor as recited in claim 1, wherein at least one of the first and second vias is constructed from a material selected from the group consisting of gold, tantalum, platinum, palladium, iridium and corresponding doped alloys thereof.

12. A method of making a capacitive pressure sensor, comprising:
    defining a differentiated height substrate recess in a substrate wafer;
    defining a diaphragm recess in a diaphragm wafer;
    defining a via recess in one of the diaphragm and substrate wafers;
    bonding the substrate wafer to the diaphragm wafer such that the differentiated height substrate recess and diaphragm recess form a height differentiated pressure chamber with a via chamber; and
    forming a via extending through the substrate wafer and into the via chamber.

13. A method as recited in claim 12, wherein a depth of the via recess is less than a depth of the corresponding main recess in the same wafer.

14. A method as recited in claim 12, further including:
 defining an electrode in the differentiated height substrate recess of the substrate wafer, wherein forming a via extending through the substrate wafer and into the via chamber includes forming a via in the differentiated height substrate recess of the substrate wafer.

\* \* \* \* \*